(12) United States Patent
Badiru

(10) Patent No.: US 10,940,884 B2
(45) Date of Patent: Mar. 9, 2021

(54) SYSTEMS AND METHODS FOR BRAKE PULL MITIGATION

(71) Applicant: GM GLOBAL TECHNOLOGY OPERATIONS LLC, Detroit, MI (US)

(72) Inventor: Ibrahim A. Badiru, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 264 days.

(21) Appl. No.: 16/003,324

(22) Filed: Jun. 8, 2018

(65) Prior Publication Data
US 2019/0375452 A1    Dec. 12, 2019

(51) Int. Cl.
*B62D 6/00* (2006.01)
*B62D 5/00* (2006.01)
*B62D 15/02* (2006.01)

(52) U.S. Cl.
CPC ............. *B62D 6/008* (2013.01); *B62D 5/006* (2013.01); *B62D 6/001* (2013.01); *B62D 15/021* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 3,866,980 A * | 2/1975 | Eisele | ....................... | B60T 8/58 303/122.1 |
| 5,231,373 A * | 7/1993 | Freeman | .............. | B60Q 1/1423 307/10.8 |
| 5,704,695 A * | 1/1998 | Monzaki | ................. | B60T 8/172 303/146 |
| 5,704,696 A * | 1/1998 | Monzaki | ............... | B60T 8/1755 303/146 |

(Continued)

FOREIGN PATENT DOCUMENTS

EP    1279584 A1 *    1/2003    ........... B62D 5/0472

OTHER PUBLICATIONS

Klaps, J. et al., Steering Drift and Wheel Movement During Braking: Parameter Sensitivity Studies, : School of Engineering, Design and Technology, University of Bradford, Bradford BD7 1DP, UK (https://journals.sagepub.com/doi/pdf/10.1243/09544070360729446)((Feb. 12, 2003) (hereinafter "Klaps").*

*Primary Examiner* — Jean Paul Cass
(74) *Attorney, Agent, or Firm* — Quinn IP Law

(57) ABSTRACT

An exemplary method for identifying and removing load biases correlated to a vehicle braking system includes providing a first vehicle sensor configured to measure a vehicle brake pressure of a vehicle brake assembly, providing a second vehicle sensor configured to measure one or more vehicle characteristics, providing a controller in communication with the first and second vehicle sensors, the vehicle brake assembly, and a vehicle steering system, receiving first (Continued)

sensor data indicative of the vehicle brake pressure and second sensor data indicative of the one or more vehicle characteristics, determining if a first condition is satisfied, and if the first condition is satisfied, generating a characterization table based on the first and second sensor data, and determining a brake-induced steering load from the first and second sensor data, wherein the characterization table includes data indicative of a relationship between the first and second sensor data.

12 Claims, 3 Drawing Sheets

(56) References Cited

U.S. PATENT DOCUMENTS

| | | | | |
|---|---|---|---|---|
| 5,782,543 A * | 7/1998 | Monzaki | ............... | B60T 8/1755 180/197 |
| 6,152,106 A * | 11/2000 | Reese, II | ............... | F02D 41/083 123/339.16 |
| 6,164,265 A * | 12/2000 | Yip | ............... | F02D 31/005 123/339.21 |
| 8,172,338 B2 * | 5/2012 | Karnjate | ............... | B60T 7/12 303/113.3 |
| 8,755,984 B2 * | 6/2014 | Rupp | ............... | B62D 15/027 303/123 |
| 2002/0198646 A1 * | 12/2002 | Bedner | ............... | B60T 8/1764 701/48 |
| 2003/0019687 A1 * | 1/2003 | Eidam | ............... | B62D 5/0472 180/446 |
| 2004/0238241 A1 * | 12/2004 | Mitchell, Jr. | ............... | B62B 5/0026 180/19.3 |
| 2005/0189163 A1 * | 9/2005 | Barton | ............... | B62D 6/003 180/446 |
| 2006/0076828 A1 * | 4/2006 | Lu | ............... | B60T 8/1755 303/146 |
| 2008/0015752 A1 * | 1/2008 | Riepold | ............... | B62D 5/0466 701/41 |
| 2010/0211264 A1 * | 8/2010 | Wey | ............... | B62D 6/00 701/41 |
| 2011/0004385 A1 * | 1/2011 | Ishimoto | ............... | B60T 7/12 701/70 |
| 2011/0046824 A1 * | 2/2011 | Antraygue | ............... | B63H 21/213 701/4 |
| 2011/0160964 A1 * | 6/2011 | Obradovich | ............... | G06F 16/221 701/41 |
| 2012/0271512 A1 * | 10/2012 | Rupp | ............... | B62D 13/06 701/41 |
| 2012/0271515 A1 * | 10/2012 | Rhode | ............... | B62D 13/06 701/42 |
| 2013/0035826 A1 * | 2/2013 | Nakatsu | ............... | B62D 5/001 701/41 |
| 2013/0076034 A1 * | 3/2013 | Matsuda | ............... | B62M 23/02 290/7 |
| 2013/0158801 A1 * | 6/2013 | Tober | ............... | B60T 8/17551 701/41 |
| 2013/0238192 A1 * | 9/2013 | Breu | ............... | B62D 15/029 701/41 |
| 2014/0052337 A1 * | 2/2014 | Lavoie | ............... | B62D 13/06 701/41 |
| 2014/0129088 A1 * | 5/2014 | Meissner | ............... | B60W 30/02 701/41 |
| 2014/0188344 A1 * | 7/2014 | Lavoie | ............... | B60W 30/00 701/41 |
| 2014/0207336 A1 * | 7/2014 | Oblizajek | ............... | B62D 15/025 701/42 |
| 2014/0222288 A1 * | 8/2014 | Lavoie | ............... | B62D 15/0285 701/41 |
| 2014/0277942 A1 * | 9/2014 | Kyrtsos | ............... | B60W 30/18036 701/41 |
| 2014/0297128 A1 * | 10/2014 | Lavoie | ............... | B60W 10/18 701/41 |
| 2014/0297129 A1 * | 10/2014 | Lavoie | ............... | B62D 13/06 701/41 |
| 2016/0159348 A1 * | 6/2016 | Lavoie | ............... | B62D 13/06 701/41 |
| 2018/0202822 A1 * | 7/2018 | DeLizio | ............... | G01C 21/3407 |
| 2019/0375452 A1 * | 12/2019 | Badiru | ............... | B62D 5/006 |

* cited by examiner

SYSTEMS AND METHODS FOR BRAKE PULL MITIGATION

INTRODUCTION

The present invention relates generally to the field of vehicles and, more specifically, to systems and methods for brake pull mitigation for steer-by-wire vehicles.

A steer-by-wire system allows the vehicle to be steered electronically, i.e., without a direct mechanical link between the steering wheel and the vehicle wheels. Steer-by-wire systems allow vehicle interior design freedoms that might otherwise not be possible with a conventional steering system having a mechanical linkage. Further, steer-by-wire systems typically have fewer mechanical parts than conventional steering systems.

In a steer-by-wire system, measured or estimated tie rod loads may be used as a basis to simulate road feedback to the vehicle operator. The steer-by-wire system has no natural means to differentiate desirable and undesirable loads. Brake-induced steering pull is one consequence of this characteristic.

SUMMARY

Embodiments according to the present disclosure provide a number of advantages. For example, embodiments according to the present disclosure enable progressive removal of load biases correlated to brake-induced steering pull prior to operator feedback emulation.

In one aspect, a method for identifying and removing load biases correlated to a vehicle braking system includes the steps of providing a vehicle steering system, providing a vehicle brake assembly, providing a first vehicle sensor configured to measure a vehicle brake pressure of the vehicle brake assembly, providing a second vehicle sensor configured to measure a vehicle characteristic, and providing a controller in communication with the first and second vehicle sensors, the vehicle brake assembly, and the vehicle steering system. The method further includes receiving first sensor data indicative of the vehicle brake pressure and receiving second sensor data and calculating a total steering load from the second sensor data, determining if a first condition is satisfied, and if the first condition is satisfied, generating a characterization table based on the first and second sensor data and determining a brake-induced steering load from the first and second sensor data. The method further includes determining a data signal indicative of a filtered steering load by comparing the total steering load with the brake-induced steering load, generating a control signal based on the filtered steering load data signal, and transmitting the control signal to the vehicle steering system.

In some aspects, the vehicle steering system is a steer-by-wire system including a steering feel emulator and transmitting the control signal to the vehicle steering system includes transmitting the control signal to the steering feel emulator.

In some aspects, the second sensor data includes one or more of a steering wheel angle, a yaw velocity, and a vehicle speed.

In some aspects, the first condition is a threshold value of one or more of the steering wheel angle, the yaw velocity, and the vehicle speed.

In some aspects, generating the characterization table includes generating a matrix of the first sensor data versus the second sensor data and determining a relationship between the first sensor data and the second sensor data.

In some aspects, the relationship between the first sensor data and the second sensor data indicates a strength of the brake-induced steering load.

In some aspects, generating the characterization table further includes recording, by the controller, a response delay between the vehicle brake pressure and receipt of the second sensor data.

In some aspects, determining the data signal indicative of the filtered steering load includes removing the brake-induced steering load from the total steering load.

In another aspect, a method for identifying and removing load biases correlated to a vehicle braking system includes providing a vehicle steering system, providing a vehicle brake assembly, providing a first vehicle sensor configured to measure a vehicle brake pressure of the vehicle brake assembly, providing a second vehicle sensor configured to measure one or more vehicle characteristics, and providing a controller in communication with the first and second vehicle sensors, the vehicle brake assembly, and the vehicle steering system. The method further includes receiving first sensor data indicative of the vehicle brake pressure and second sensor data indicative of the one or more vehicle characteristics, determining if a first condition is satisfied, and if the first condition is satisfied, generating a characterization table based on the first and second sensor data, and determining a brake-induced steering load from the first and second sensor data, wherein the characterization table includes data indicative of a relationship between the first and second sensor data.

In some aspects, determining if the first condition is satisfied includes comparing the one or more vehicle characteristics to one or more enablement criteria, wherein the one or more vehicle characteristics include a steering wheel angle, a yaw velocity, and a vehicle speed and the enablement criteria include threshold values for each of the steering wheel angle, the yaw velocity, and the vehicle speed.

In some aspects, the second sensor data is indicative of a total steering load.

In some aspects, the method further includes determining a data signal indicative of a filtered steering load by subtracting the brake-induced steering load from the total steering load.

In some aspects, the vehicle steering system is a steer-by-wire system including a steering feel emulator and the method further includes generating, by the controller, a steering feel emulator control signal based on the filtered steering load data signal.

In some aspects, generating the characterization table includes recording a response delay between the first sensor data and receipt of the second sensor data.

In yet another aspect, a system for identifying and removing load biases correlated to a vehicle braking system includes a vehicle steering system, a vehicle brake assembly, a first vehicle sensor configured to measure a vehicle brake pressure of the vehicle brake assembly, a second vehicle sensor configured to measure a total steering load, and a controller in communication with the first and second vehicle sensors, the vehicle brake assembly, and the vehicle steering system. In various aspects, the controller is configured to receive first sensor data indicative of the vehicle brake pressure and second sensor data indicative of the total steering load, determine if a first condition is satisfied and if the first condition is satisfied, generate a characterization table based on the first and second sensor data and determine a brake-induced steering load from the first and second sensor data. The controller is further configured to determine a data signal indicative of a filtered steering load by removing the brake-induced steering load from the total steering load, and generate a control signal based on the filtered steering load data signal.

In some aspects, the vehicle steering system is a steer-by-wire system including a steering feel emulator and the controller is further configured to transmit the control signal to the steering feel emulator.

In some aspects, the second sensor data includes a steering wheel angle, a yaw velocity, and a vehicle speed.

In some aspects, the first condition is a threshold value of each of the steering wheel angle, the yaw velocity, and the vehicle speed.

In some aspects, generating the characterization table includes plotting the first sensor data against the second sensor data, fitting a line to the plotted data, and determining a slope of the line and the slope of the line indicates a strength of the brake-induced steering load.

In some aspects, generating the characterization table further includes recording a response delay between the vehicle brake pressure and receipt of the second sensor data.

BRIEF DESCRIPTION OF THE DRAWINGS

The present disclosure will be described in conjunction with the following figures, wherein like numerals denote like elements.

Figure 1:
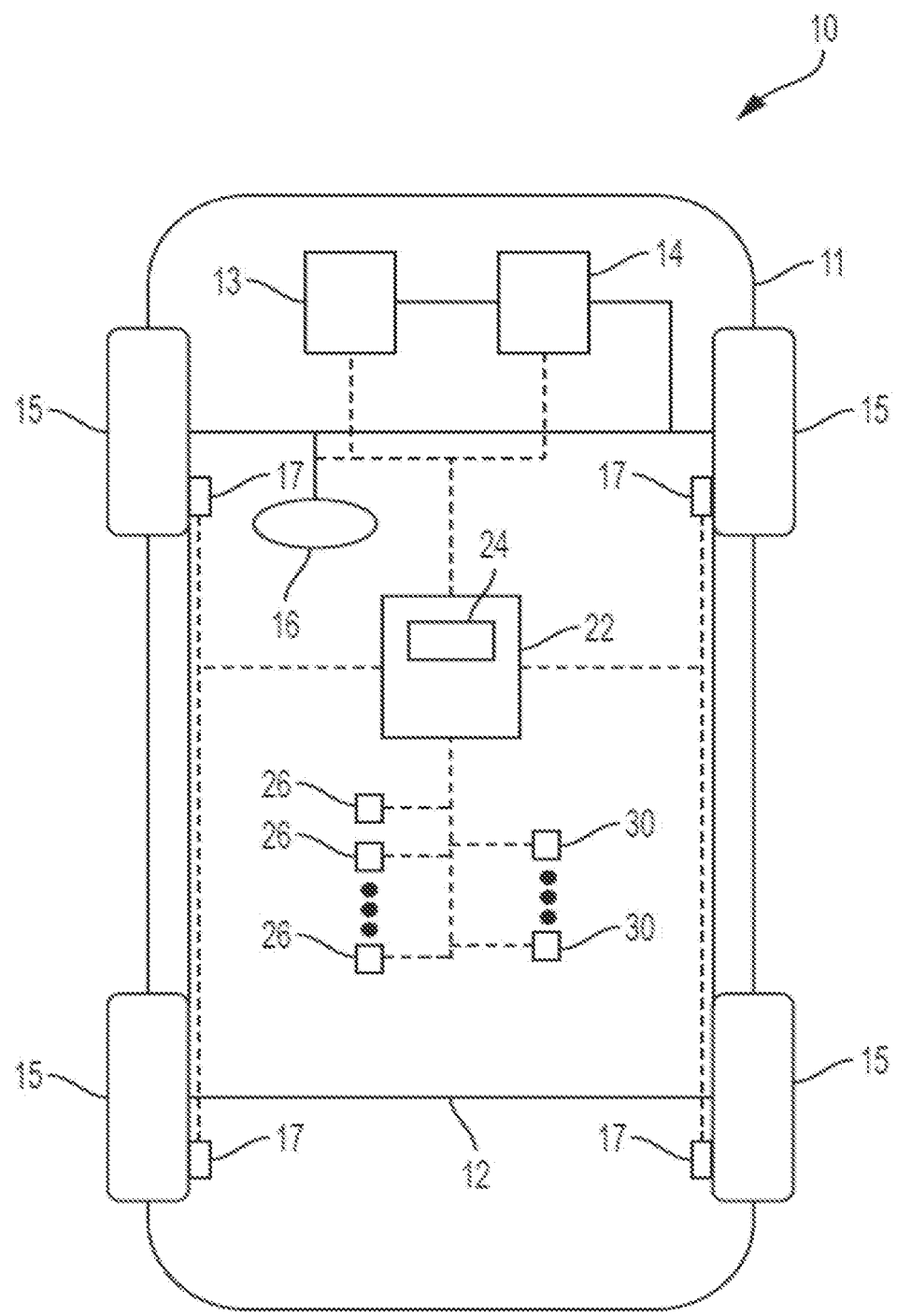
FIG. 1 is a functional block diagram of a vehicle that includes, among other features, a steering system and a vehicle braking system in accordance with exemplary embodiments.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Brake-induced forces affecting the steering feel experienced by a vehicle operator can be caused by both random and consistent effects. Consistent effects include uneven brake characteristics on the left and ride sides of the vehicle due to brake wear or contamination, uneven brake pressure side-to-side, uneven vehicle suspension and/or steering geometry, tire friction coefficient differences side-to-side, and suspension compliance difference side-to-side of the vehicle, for example and without limitation. To prevent these consistent and detectable effects from being passed to the vehicle operator as haptic feedback via a steering feel emulator of a steer-by-wire system, embodiments discussed herein analyze sensor data from one or more vehicle sensors and characterize the data to determine the tie rod loads associated with these undesirable braking effects. These undesirable effects are removed from the tie rod load signal that is then used as the basis for the feedback transmitted to the operator, thereby transmitting a "selectively filtered" or true cornering load signal to the operator independent of brake pull effects due to suspension system, steering system, braking system, or other consistent, detectable effects.

FIG. 1 schematically illustrates an automotive vehicle 10 according to the present disclosure. Although the figures shown herein depict an example with certain arrangements of elements, additional intervening elements, devices, features, or components may be present in an actual embodiment. It should also be understood that FIG. 1 is merely illustrative and may not be drawn to scale.

The vehicle 10 generally includes a body 11, a chassis 12, and wheels 15. The body 11 is arranged on the chassis 12 and substantially encloses the other components of the vehicle 10. The body 11 and chassis 12 may jointly form a frame. The wheels 15 are each rotationally coupled to the chassis 12 near a respective corner of the body 11 via one or more suspension system components (not shown). In some embodiments, the suspension system includes one or more linkages, shock absorbers, or other components that connect the wheels 15 to the chassis 12 and allow relative motion therebetween. The vehicle 10 is depicted in the illustrated embodiment as a passenger car, but it should be appreciated that any other vehicle including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. The vehicle 10 additionally includes a brake assembly 17 configured to provide braking torque to the vehicle wheels 15. The brake assembly 17 may, in various embodiments, include friction brakes, a regenerative braking system such as an electric machine, and/or other appropriate braking systems. In some embodiments, the brake assembly 17 is an electromechanical brake assembly that includes at least one brake pad, a brake caliper, a brake rotor, and a drive unit.

The vehicle 10 additionally includes a steering system 16. In various embodiments, the steering system 16 is a steer-by-wire system that makes use of electric motors to turn the wheels, sensors to determine how much steering force to apply, and steering feel emulators to provide haptic feedback to the driver via a steering wheel (not shown).

With further reference to FIG. 1, the vehicle 10 also includes a sensing system including a plurality of sensors 26 configured to measure and capture data on one or more vehicle characteristics, including but not limited to vehicle speed, tie rod load, brake pressure, steering wheel angle, yaw velocity, lateral acceleration, etc. In the illustrated embodiment, the sensors 26 include, but are not limited to, an accelerometer, a speed sensor, a pressure sensor, or other sensors that sense observable conditions of the vehicle or the environment surrounding the vehicle and may include RADAR, LIDAR, optical cameras, thermal cameras, ultrasonic sensors, and/or additional sensors as appropriate. One or more of the sensors 26 are included in each of the steering system 16 and the braking assembly 17; however, one or more sensors 26 are located throughout the vehicle 10 and, in some embodiments, are included within an inertial measurement unit (IMU; not shown) of the vehicle 10. The vehicle 10 also includes a plurality of actuators 30 configured to receive control commands to control steering, shifting, throttle, braking, or other aspects of the vehicle 10, as discussed in greater detail below.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media 72 (see FIG. 2). Computer readable storage devices or media 72 may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media 72 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle, including the brake assembly 17 and the steering system 16.

In some embodiments, the controller 22 includes a brake load mitigation system 24. The brake load mitigation system 24 receives data from the steering system 16 and the brake assembly 17 and processes and synthesizes the data to remove brake induced steering pull from the simulated road feedback information prior to delivery of the feedback to the vehicle operator.

Figure 2:
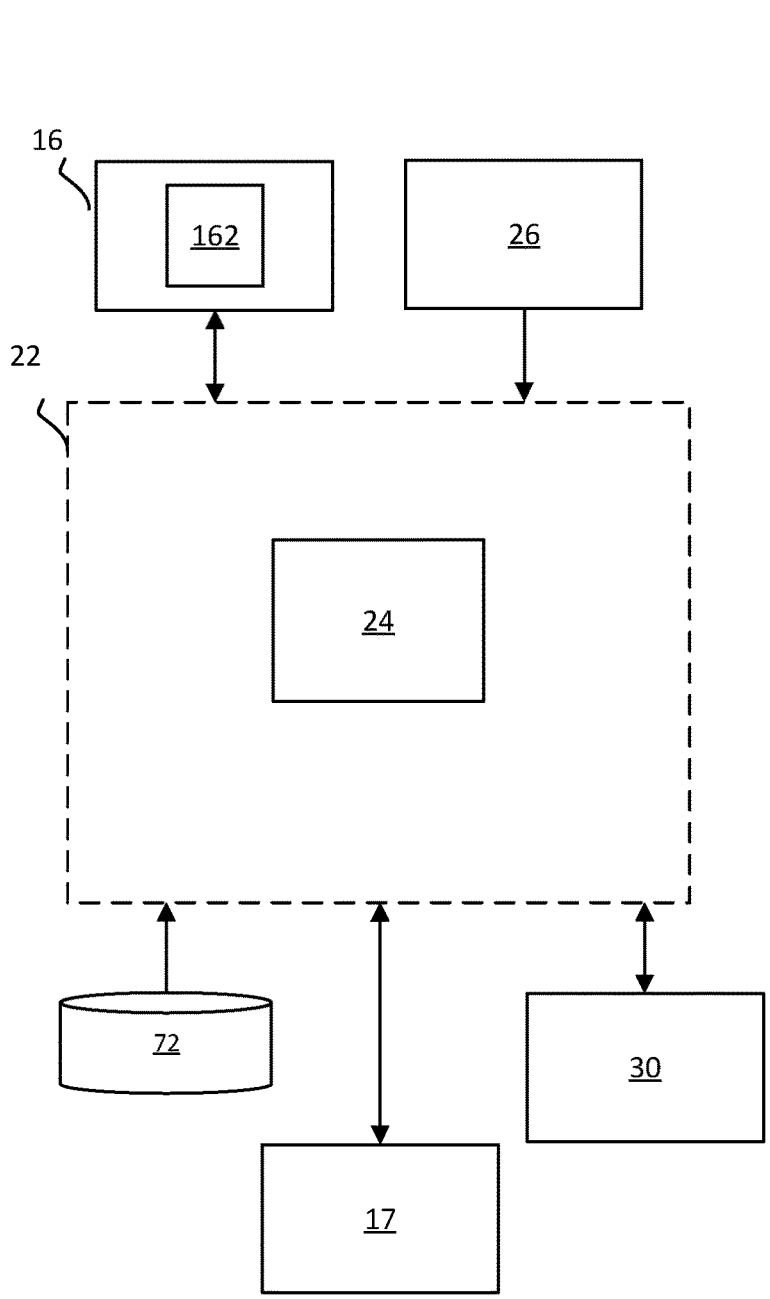
FIG. 2 is a functional block diagram of a control system for a vehicle steering system, according to an embodiment.

As shown in FIG. 2, the steering system 16, the braking system 17, the plurality of sensors 26, and the plurality of actuators 30 are in electronic communication with the controller 22. The brake load mitigation system 24 of the controller 22 receives data, including sensor data, from the steering system 16, the braking system 17, and the plurality of sensors 26 and, using the sensor data, generates one or more control signals to control vehicle braking, and/or vehicle steering via the plurality of actuators 30. In some embodiments, one or more control signals are received by a steering feel emulator 162 of the steering system 16. The computer-readable storage devices or media 72 are in electronic communication with the controller 22 and are capable of storing data, such as a characterization table, as well as executable instructions used by the brake load mitigation system 24 of the controller 22.

Figure 3:
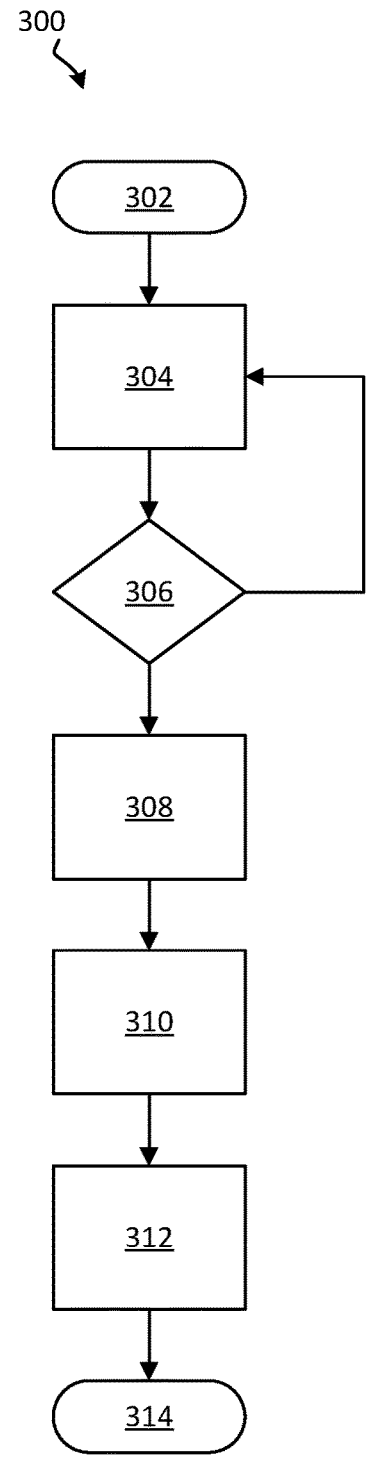
FIG. 3 is a flowchart of a method for controlling a vehicle, specifically determining a component of a steering load due to brake pull, according to an embodiment.

FIG. 3 illustrates a method 300 to characterize a brake load effect, according to an embodiment. The method 300 can be utilized in connection with components of the vehicle 10, including the steering system 16, the braking system 17, the sensors 26, and the brake load mitigation system 24 of the controller 22. The method 300 can be utilized in connection with the controller 22 and the computer-readable storage devices or media 72 as discussed herein, or by other systems associated with or separate from the vehicle, in accordance with exemplary embodiments. The order of operation of the method 300 is not limited to the sequential execution as illustrated in FIG. 3, but may be performed in one or more varying orders, or steps may be performed simultaneously, as applicable in accordance with the present disclosure.

In some embodiments, the controller 22 progressively builds a matrix of brake pressure data versus tie rod load data during moderate to hard straight line braking, signified by specific vehicle threshold conditions of steering wheel angle, lateral acceleration, yaw velocity, vehicle speed, and brake deceleration, and stores this data in a vehicle characterization table accessible to the brake load mitigation system 24 for application to calculations used to mitigate the brake-pull induced steering loads transmitted to the operator. The method 300 begins at 302 and proceeds to 304. At 304, the controller 22 receives sensor data signals from one or more of the sensors 26. The sensor data includes data on one or more of steering wheel angle, yaw velocity, vehicle speed, and brake pressure, for example and without limitation. The sensor data is indicative of a total steering load of the vehicle 10 that is, in some embodiments, due to tie rod load. In some embodiments, the controller 22 continuously receives and monitors the data received from the sensors 26.

Next, at 306, the controller 22 analyzes the sensor data and compares the sensor data to enablement criteria, such as threshold values of steering wheel angle, yaw velocity, vehicle speed, and brake pressure, for example and without limitation, to determine if a first condition is satisfied. In order to ensure the sensor data collected truly represents vehicle-specific straight-line braking behavior, the enablement criteria for steering wheel angle, yaw velocity, vehicle speed, lateral acceleration, and brake deceleration are scalable and tunable depending on the vehicle type, geometry, environment conditions, etc. for example and without limitation.

If the comparison performed at 306 is negative, that is, one or more of the sensor data signals for steering wheel angle, yaw velocity, vehicle speed, and brake pressure does not meet the enablement criteria, the method 300 returns to 304 and proceeds as discussed herein.

If the comparison performed at 306 is positive, that is, the sensor data signals meet or exceed the enablement criteria, the method 300 proceeds to 308. At 308, the controller 22 starts a timer and continues to receive sensor data. In some embodiments, the controller 22 records the sensor data if the controller 22 receives at least two (2) seconds of continuous sensor data that meet the enablement criteria. In some embodiments, the controller 22 records the sensor data if the duration of reception of continuous sensor data is less than or more than two seconds. Additionally, the controller 22 also adds any feature torque applied during the recorded time interval to the steering load determined from the sensor data to determine a total steering load.

The method 300 then proceeds to 310. Due to the dynamic response characteristics of the brake assembly 17 there is a time delay between the brake application and the resulting brake-induced steering load. At 310, the controller 22 shifts the steering load data relative to the measured brake pressure based on a calculated response delay. The response delay is the gross time lag between the applied brake pressure and the resultant steering load. This delay is accounted for in both the generation of a vehicle characterization table and the subsequent removal of the brake-induced loads from a total steering load data signal transmitted to the steering feel emulator 162. The response delay can be calculated using classical engineering methods of time-delay analysis, for example and without limitation, cross-correlation calculates the regression coefficient between two signals for a series of proposed time delays, to find the delay time that maximizes the regression coefficient.

At 312, the controller 22 adds the new data point to the vehicle characterization table created from continuously recording the steering load data and the measured brake pressure data. The characterization table represents steering load compensation and response delay offset. In some embodiments, the characterization table is stored on storage media that is electronically connected to or incorporated within the controller 22. As discussed above, the characterization table includes data related to the first order lag time constant that is learned from correlation of previously recorded brake pressure and steering load response data. In some embodiments, the characterization data includes a characterization scatter plot of steering load versus master cylinder brake pressure. The controller 22 applies data analysis techniques to fit a line to the plotted data. The slope and strength of the line is used to determine the strength of a braking-induced steering load or pull. In some embodiments, the last 200 calibratable brake applications are used to generate the characterization table. In other embodiments, more or fewer brake applications are used to generate the characterization data. The method 300 then proceeds to 314 and ends.

In some embodiments, the method 300 runs continuously such that steering load compensation and response delay offset data is continuously added to the characterization table stored in the computer-readable storage devices or media 72.

Figure 4:
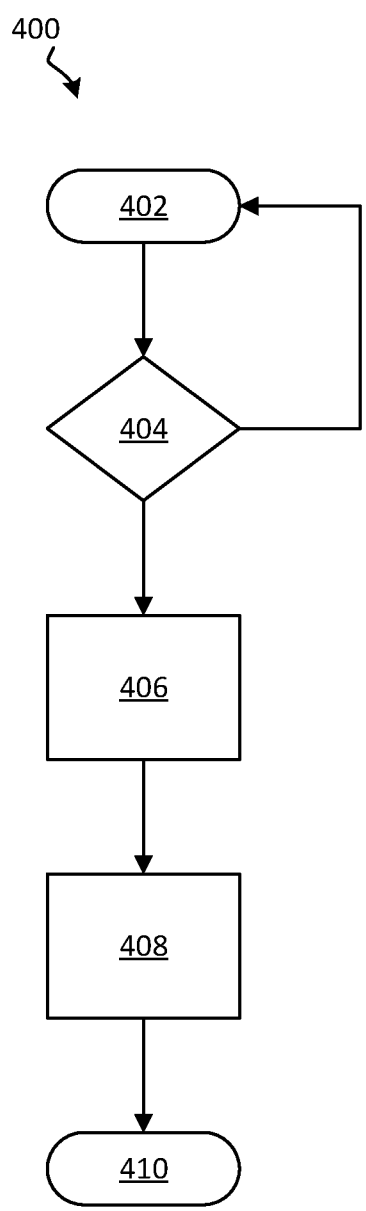
FIG. 4 is a flowchart of a method for controlling a vehicle, specifically a method to mitigate brake pull, according to an embodiment.

FIG. 4 illustrates a method 400 to control a vehicle steering system, according to an embodiment. The method 400 can be utilized in connection with components of the vehicle 10, including the steering system 16, the braking system 17, the sensors 26, and the brake pull mitigation system 24 of the controller 22. The method 400 can be utilized in connection with the controller 22 and the computer-readable storage devices or media 72 as discussed herein, or by other systems associated with or separate from the vehicle, in accordance with exemplary embodiments. The order of operation of the method 400 is not limited to the sequential execution as illustrated in FIG. 4, but may be performed in one or more varying orders, or steps may be performed simultaneously, as applicable in accordance with the present disclosure.

The steps of the method 400 illustrate how the controller 22 applies the steering load compensation and response delay offset data captured and stored during execution of the method 300 to remove brake-induced steering load or pull from the total steering load road feedback information prior to delivery of the feedback to the vehicle operator. In some embodiments, one or more of the steps of the method 400 are performed simultaneously with one or more of the steps of the method 300. In some embodiments, one or more of the steps of the method 400 are performed subsequent to one or more of the steps of the method 300.

The method 400 begins at 402 and proceeds to 404. At 404, the controller 22 determines if the enablement criteria for the sensor data related to steering wheel angle, vehicle speed, brake pressure, and yaw velocity are met, as at step 308 in method 300. If the determination made at 404 is negative, that is, the enablement criteria are not met, method 400 returns to 402 and proceeds as discussed herein.

If the determination made at 404 is positive, that is, the enablement criteria for the sensor data are met, the method 400 proceeds to 406. At 406, the controller 22 determines the steering load associated with the current brake application. The controller 22 accesses and analyzes the steering load compensation and response delay offset data stored in the characterization table (as discussed above with respect to method 300) to determine the component of the total steering load expected due to brake pressure, that is, a brake-induced steering load.

Next, at 408, the controller 22 removes the brake-induced steering load component, acquired from the characterization table and determined at 406, from the total steering load to obtain a filtered steering load data signal. In some embodiments, the controller 22 also applies a phase delay to the filtered steering load data signal based on the learned response delay determined at step 310 of the method 300. At 408, the controller 22 also generates a control signal based on the filtered steering load data signal. The control signal is transmitted to the steering feel emulator 162 of the steering system 16 such that the emulator 162 transmits a more accurate steering feel or "selectively filtered" road load signal to the operator. The method 400 then proceeds to 410 and ends.

In some embodiments, both of the methods 300 and 400 run continuously and simultaneously. In other embodiments, one or more steps of the method 300 are performed prior to one or more of the steps of the method 400.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for identifying and removing load biases correlated to a vehicle braking system, the method comprising:

providing a vehicle steering system including a steering feel emulator;

providing a vehicle brake assembly;

providing a first vehicle sensor configured to measure a vehicle brake pressure of the vehicle brake assembly;

providing a second vehicle sensor configured to measure one or more vehicle characteristics;

providing a controller in communication with the first and second vehicle sensors, the vehicle brake assembly, and the vehicle steering system;

receiving, by the controller, first sensor data indicative of the vehicle brake pressure and second sensor data indicative of the one or more vehicle characteristics;

calculating, by the controller, a total steering load from the second sensor data;

determining, by the controller, if a first condition is satisfied;

if the first condition is satisfied, receiving and continuously recording first and second sensor data for a predetermined time period during which the first condition is satisfied, progressively generating a characterization table representing a steering load compensation and response delay offset based on the first and second sensor data, and determining, by the controller, a brake-induced steering load from the first and second sensor data, wherein the characterization table includes data indicative of a relationship between the first and second sensor data;

determining, by the controller, a data signal indicative of a filtered steering load by subtracting the brake-induced steering load from the total steering load; and generating, by the controller, a steering feel emulator control signal based on the filtered steering load data signal, the control signal removing the brake-induced steering load from the total steering load prior to delivery of steering feedback to the vehicle steering system.

2. The method of claim 1 further comprising transmitting the control signal to the steering feel emulator.

3. The method of claim 1, wherein the relationship between the first sensor data and the second sensor data indicates a strength of the brake-induced steering load.

4. The method of claim 1, wherein determining if the first condition is satisfied comprises comparing the one or more vehicle characteristics to one or more enablement criteria, wherein the one or more vehicle characteristics include a steering wheel angle, a yaw velocity, and a vehicle speed and the enablement criteria include threshold values for each of the steering wheel angle, the yaw velocity, and the vehicle speed.

5. The method of claim 4, wherein the second sensor data is indicative of a total steering load.

6. The method of claim 1, wherein generating the characterization table includes recording, by the controller, a response delay between the first sensor data and receipt of the second sensor data.

7. A system for identifying and removing load biases correlated to a vehicle braking system, comprising:
a vehicle steering system;
a vehicle brake assembly;
a first vehicle sensor configured to measure a vehicle brake pressure of the vehicle brake assembly;
a second vehicle sensor configured to measure a total steering load;
a controller in communication with the first and second vehicle sensors, the vehicle brake assembly, and the vehicle steering system, the controller configured to
receive first sensor data indicative of the vehicle brake pressure and second sensor data indicative of the total steering load;
determine if a first condition is satisfied;
if the first condition is satisfied, receive and continuously record first and second sensor data for a predetermined time period during which the first condition is satisfied, progressively generate a characterization table representing a steering load compensation and response delay offset based on the first and second sensor data and determine a brake-induced steering load from the first and second sensor data, wherein the characterization table includes data indicative of a relationship between the vehicle brake pressure and the total steering load;
determine a data signal indicative of a filtered steering load by subtracting the brake-induced steering load from the total steering load; and
generate a control signal based on the filtered steering load data signal, the control signal removing the brake-induced steering load from the total steering load prior to delivery of steering feedback to the vehicle steering system.

8. The system of claim 7, wherein the vehicle steering system is a steer-by-wire system including a steering feel emulator and the controller is further configured to transmit the control signal to the steering feel emulator.

9. The system of claim 7, wherein the second sensor data includes a steering wheel angle, a yaw velocity, and a vehicle speed.

10. The system of claim 9, wherein the first condition is a threshold value of each of the steering wheel angle, the yaw velocity, and the vehicle speed.

11. The system of claim 7, wherein generating the characterization table includes plotting the first sensor data against the second sensor data, fitting a line to the plotted data, and determining a slope of the line and the slope of the line indicates a strength of the brake-induced steering load.

12. The system of claim 11, wherein generating the characterization table further includes recording a response delay between the vehicle brake pressure and receipt of the second sensor data.

* * * * *